(12) United States Patent
Skachkov et al.

(10) Patent No.: US 12,383,846 B2
(45) Date of Patent: Aug. 12, 2025

(54) METHOD AND DESIGN OF MULTIPLE COUNTERROTATING UNIT REACTOR

(71) Applicant: Schlumberger Technology Corporation, Sugar Land, TX (US)

(72) Inventors: Roman Alexandrovich Skachkov, Rosharon, TX (US); Shahnawaz Hossain Molla, Cambridge, MA (US); Zikri Bayraktar, Cambridge, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 99 days.

(21) Appl. No.: 18/181,201

(22) Filed: Mar. 9, 2023

(65) Prior Publication Data

US 2024/0299860 A1    Sep. 12, 2024

(51) Int. Cl.
| | | |
|---|---|---|
| *B01D 3/30* | (2006.01) | |
| *B01D 1/22* | (2006.01) | |
| *B01D 3/08* | (2006.01) | |
| *B01D 3/26* | (2006.01) | |
| *B01D 3/42* | (2006.01) | |
| *C02F 1/08* | (2023.01) | |

(52) U.S. Cl.
CPC ............... *B01D 3/30* (2013.01); *B01D 1/222* (2013.01); *B01D 3/08* (2013.01); *B01D 3/26* (2013.01); *B01D 3/4211* (2013.01); *C02F 1/08* (2013.01)

(58) Field of Classification Search
CPC . B01D 1/222; B01D 3/08; B01D 3/26; B01D 3/30; B01D 3/4211; C02F 1/08
See application file for complete search history.

(56) References Cited

U.S. PATENT DOCUMENTS

| | | | |
|---|---|---|---|
| 2,281,616 A | 5/1942 | Placed | |
| 3,135,588 A | 6/1964 | Helming | |
| 3,640,330 A | 2/1972 | Javet | |
| 3,809,375 A | 5/1974 | Bonnet | |
| 4,995,945 A * | 2/1991 | Craig | B01D 3/24 96/205 |
| 5,955,326 A | 9/1999 | Bungay, III et al. | |
| 6,884,284 B1 * | 4/2005 | Jensen | B01D 3/08 95/218 |
| 7,344,126 B2 * | 3/2008 | Ji | B01D 3/30 261/84 |

(Continued)

FOREIGN PATENT DOCUMENTS

| | | |
|---|---|---|
| CN | 101372522 | 2/2009 |
| CN | 201529413 U | 7/2010 |

(Continued)

OTHER PUBLICATIONS

Chandra, A. et al., "Characteristics of Flow in a Rotating Packed Bed (HIGEE) with Split Packing", Industrial & Engineering Chemical Research, 2005, 44, pp. 4051-4060.

(Continued)

*Primary Examiner* — Jonathan Miller
(74) *Attorney, Agent, or Firm* — Jeffrey D. Frantz

(57) ABSTRACT

Embodiments presented provide for a multirotational counter rotating reactor. The reactor is configured to accept a fluid stream and separate the fluid stream into high quality liquid and gaseous phases through spinning of the sets of discs as well as through performing a heat transfer to the fluid stream.

13 Claims, 15 Drawing Sheets

(56) References Cited

U.S. PATENT DOCUMENTS

| | | | |
|---|---|---|---|
| 7,550,116 B2 | 6/2009 | Wilhelm et al. | |
| 7,649,024 B2 | 1/2010 | Li et al. | |
| 7,666,950 B2 | 2/2010 | Ong et al. | |
| 8,448,926 B2* | 5/2013 | Dutra E Mello | B01D 53/185 95/149 |
| 8,475,616 B2 | 7/2013 | McCutchen | |
| 8,551,295 B2* | 10/2013 | Chen | B01D 3/009 422/312 |
| 8,568,597 B2 | 10/2013 | Su et al. | |
| 8,679,232 B2* | 3/2014 | Wolf | B01D 3/30 96/281 |
| 9,102,545 B2* | 8/2015 | Riley | F22B 3/06 |
| 9,987,589 B2* | 6/2018 | Kotagiri | B01D 53/185 |
| 10,821,393 B2 | 11/2020 | Elliott et al. | |
| 2004/0015003 A1 | 1/2004 | Yang et al. | |
| 2005/0022666 A1 | 2/2005 | Liu et al. | |
| 2008/0038115 A1 | 2/2008 | Burns et al. | |
| 2008/0267843 A1 | 10/2008 | Burns et al. | |
| 2010/0068381 A1 | 3/2010 | Liu | |
| 2010/0242348 A1 | 9/2010 | Chen et al. | |
| 2011/0214979 A1* | 9/2011 | Chen | B01D 3/009 202/238 |
| 2011/0303088 A1* | 12/2011 | Dutra E Mello | B01D 3/08 95/151 |
| 2012/0039795 A1 | 2/2012 | Chen | |
| 2013/0319235 A1* | 12/2013 | Wolf | B01D 3/30 261/22 |
| 2014/0050633 A1* | 2/2014 | van der Schaaf | B01F 33/811 422/187 |
| 2014/0066580 A1 | 3/2014 | Joo et al. | |
| 2016/0243495 A1 | 8/2016 | Dutra e Mello | |
| 2016/0317967 A1* | 11/2016 | Kotagiri | B01F 23/2321 |
| 2018/0056234 A1 | 3/2018 | Weng | |
| 2020/0261846 A1 | 8/2020 | Mobley | |
| 2024/0299896 A1 | 9/2024 | Skachkov | |

FOREIGN PATENT DOCUMENTS

| | | |
|---|---|---|
| CN | 103463938 A | 12/2013 |
| CN | 104841346 A | 8/2015 |
| CN | 106040159 A | 10/2016 |
| CN | 110339655 A | 10/2019 |
| CN | 112934156 A | 6/2021 |
| CN | 113006905 A | 6/2021 |
| EP | 0002568 A1 | 6/1979 |
| EP | 0053881 B1 | 5/1985 |
| EP | 1464389 A1 | 10/2004 |
| EP | 2018900 A3 | 9/2010 |
| IN | 201921008821 | 3/2019 |
| IN | 201921019515 | 5/2019 |
| WO | 2011094984 A1 | 8/2011 |
| WO | 2013143243 A1 | 10/2013 |

OTHER PUBLICATIONS

Cortes Garcia, G. E. et al., "A review on process intensification in HiGee distillation", Journal of Chemical Technology and Biotechnology, 2017, 92, pp. 1136-1156.

Lin, C.-C. et al., "Characteristics of a rotating packed bed equipped with blade packings", Separation and Purification Technology, 2007, 54(1), pp. 51-60.

Munjal, S. et al., "Mass-Transfer in Rotating Packed Beds-I. Development of Gas-Liquid and Liquid-Solid Mass-Transfer Correlations", Chemical Engineering Science, 1989, 44(10), pp. 2245-2256.

Oko, E. et al., "Current status and future development of solvent-based carbon capture", International Journal of Coal Science & Technology, 2017; 4(1), pp. 5-14.

Rao, D. P. et al., "Torsional-Couette-Flow HiGee", Chemical Engineering and Processing—Process Intensification, 2020, 147, 107722, 7 pages.

Sivalingam, G. et al., "Process Intensification in a Model Trickle Bed Reactor", Industrial & Engineering Chemistry Research, 2002, 41(13), pp. 3139-3144.

Youzhi, L., et al., "Mass transfer characteristics in a rotating packed bed with split packing", Chinese Journal of Chemical Engineering, 2015, 23(5), pp. 868-872.

Yu, Y.-L. et al., "Experimental study on characteristics of electric power consumption of the zigzag rotating bed", Petro-Chemical Equipment, 2004, 33(4), 4 pages with English Abstract.

Search Report and Written Opinion of International Patent Application No. PCT/US2024/019062 dated Jul. 1, 2024, 11 pages.

Search Report and Written Opinion of International Patent Application No. PCT/US2024/019041 dated Jul. 3, 2024, 11 pages.

* cited by examiner

METHOD AND DESIGN OF MULTIPLE COUNTERROTATING UNIT REACTOR

CROSS-REFERENCE TO RELATED APPLICATIONS

None.

FIELD OF THE DISCLOSURE

Aspects of the disclosure relate to separation, absorption, desorption and interphase heat exchange capabilities of gasses and liquids from a fluid stream. More specifically, aspects of the disclosure relate to multirotational unit reactors configured to perform high efficiency separations functions, absorption and desorption capabilities, wherein the multiple counterrotating unit reactors have heat transfer capabilities to enhance separation capabilities and allow higher mass transfer through the reactor.

BACKGROUND

Separation, absorption, desorption and interphase heat exchange processes play a vital role in most of the heavy processing, chemical, petrochemical, and pharmaceutical industries. Today's society necessitates the processing of chemicals, particularly to extract and dispose of the main atmospheric gas pollutants, largely: sulfur dioxide, hydrogen sulfide, nitrous oxide, ammonia, various hydrocarbons, and carbon dioxide—the main contributor to global warming. Normally, industry processes utilize liquids where dissolved gases within those liquids lead to the deterioration characteristics of the end products as well as damage to the processing systems themselves.

A standard solution to the problems involves the use of packed bed columns. Though great variability in designs and parameters exist, the main principle remains the same—the liquid flows under the influence of the earth's gravity (denoted by G) contra directionally to the gas stream. In fact, gravity determines the allowable liquid and gas throughputs and achievable mass-transfer rates. These values, in turn, stipulate the high bulkiness of the packed bed columns for industrial-scale facilities.

One of the most promising methods to make the packed beds compact are the Rotated Packed Beds, hereinafter "RPBs". The RPBs are also known as "HiGees" because centripetal acceleration in in the RPBs can achieve 1000 g, where g is defined as the acceleration of gravity. In these designs, packing may have 10 times larger surface area, thereby achieving 10 times higher mass-transfer rate. In these designs, the liquid flows as thin films under the high centripetal acceleration, there is an enhancement in the liquid-side mass-transfer coefficient. Such mass-transfer coefficients may be 2 to 8 times higher than that in a conventional packed column. As a result, RPBs can be $1/10^{th}$ the size of conventional packed bed columns. This is illustrated in FIG. 1.

Though there is a number of packed beds successfully operating in the industry, all the details of the process inside them are not completely understood, and their architecture and optimal design parameters are still under research and development. The existing development for conventional apparatus is governed by several principles. One principle is to provide a more efficient/compact design for the footprint of the facility. The other principle is the needed range of operational requirements, such as gas sweetening and oxygen removal. The compactness of HiGees remains one governing parameter for the overall design. In one example embodiment, providing carbon capture services for modern industrial-scale power plants utilizing fossil fuels, such an embodiment would require hundreds of conventional RPBs with amine absorbent per 1 Gigawatt of generated energy, hence the scale of the facility would be comparable with the fossil fuel plant itself.

A wide variety of RPB designs exist, and aspects of concern, herein consider liquid-gas types only, which are regarded in the industry as highly efficient in cleaning harmful components of the flue gases and can be used for $CO_2$ capture purpose. Based on design internals, this family of RPBs can be conditionally classified as follows: with mono-block packing (see, FIG. 2a); with split packing (see, FIG. 2b); with baffles and blades (see, FIG. 2c); zigzag type (see, FIG. 2d); and spinning disc/rotor-stator reactor (see, FIG. 3).

RPB with mono-block packing normally introduces the simplest design and in order to increase efficiency, a variety of packings are utilized, such as wire-mesh, foams, and beads (see, FIG. 2a). The doughnut shape geometry of RPBs introduces limitations to their capabilities. Variation in flow area leads to a significant decrease in radial velocities of the gas and liquid along the radius, which, in turn, adversely affects the allowable throughputs (due to flooding) and local mass transfer coefficients.

It is known that rotational structures can use high interfacial packing. Such packings may enhance a liquid-side coefficient but such packings do not enhance the gas side mass-transfer coefficients generally. Also, the mono-block packing design represents more limitations such as low tangential slip velocities and low residence of gas in RPBs.

An effective method of the local mass-transfer coefficient equalization versus the bed's radius was proposed by some conventional designs. These configurations propose to replicate liquid entrance conditions over the bed by dividing the packing into annular rings with the proper gaps between them. One example of such a configuration is presented in FIG. 2b.

Referring to FIG. 3, another conventional reactor is illustrated. In FIG. 3, a spinning disc/rotor-stator reactor is illustrated. This reactor is known as a basic torsional-Couette flow HiGeesTop.

One conventional apparatus uses a split packing design to further increase the efficiency of liquid-gas interaction. This apparatus uses rotating alternate rings in opposite directions, the slip velocity between gas and liquid can be set several times higher than in the HiGeesTop with mono-block packing, which in turn, enhances the gas side mass transfer coefficient.

The effort to equalize the mass-transfer coefficient over the bed is illustrated in FIG. 2c. This design has several serious drawbacks which include low interfacial area and low compactness, which lead to low effectiveness of this kind of RPBs in general.

The requirement to have multiple feeds along the axis of the bed made favorable ground for the proposal of zigzag RPBs. An apparatus like this utilizes coupled circular stator and rotor discs (see, FIG. 2d). In this embodiment, the stationary disc is normally placed on top and can be used for multiple liquid feeding with the opportunity to organize it as driven by gravity only in order to minimize energy losses on its supply.

Another conventional type of RPBs is the spinning disc/rotor-stator reactor (see, FIG. 3). This kind of RPB uses the principle of contra directional flow of gas and liquid film thinning and accelerating by spinning discs. The simplicity of design leads to the situation where this kind of reactor occupied a significant place in the whole RPB's family. Nevertheless, the efficiency of the reactors can be significantly increased.

The design of torsional-Couette-flow HiGees is of note. It can be concluded that the use of this design can increase the efficiency of such systems up to three times.

There is a need to provide an apparatus and methods that are easier to operate than conventional apparatus and methods.

There is a further need to provide apparatus and methods that do not have the drawbacks discussed above, namely inadequate efficiency or footprints that are too large for industrial users.

There is a still further need to reduce economic costs associated with operations and apparatuses described above with conventional tools, while increasing the efficiency of the separation, absorption, desorption and interphase heat exchange capabilities of liquid phases from gaseous phases in a given fluid stream.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one example embodiment, an apparatus is disclosed. The apparatus may comprise a casing defining an interior volume, the casing having a plurality of entrances configured to inject a gas into the interior volume, the casing further having a top and bottom opening. The apparatus may also comprise at least a first set of discs configured to rotate around an axis, the at least first set of discs placed within the interior volume and configured to rotate in a first direction. The apparatus may also comprise at least a second set of discs configured to rotate around the axis, the at least second set of discs placed within the interior volume and configure to rotate in a second direction, wherein the first direction is different than the second direction. The apparatus may also comprise a first shaft with a first end and a second end, the shaft connected to the first set of discs. The apparatus may also comprise a second shaft connected to the second set of discs. The apparatus may also comprise a set of heat conductors placed within at least one of the first set of discs and second set of discs, wherein upon rotation of the first shaft, the first set of discs is configured to rotate and wherein upon rotation of the second shaft the second set of discs is configured to rotate and wherein a fluid entering the casing through the top opening of the casing undergoes a heat transfer and is separated into a liquid phase and a gas phase and wherein the liquid phase is configured to exit the bottom opening and the gas phase is configured to exit the top opening, wherein the plurality of entrances has a shape of one of a slot, a circle, an oval, a rectangle, a triangle, a pentagon or any other applicable shape.

Another example embodiment of the disclosure presents a method. The method may provide for separating a fluid stream into a liquid phase and a gas phase. The method may comprise providing the fluid stream to a rotating packed bed arrangement. The method may also comprise inserting the fluid stream into the packed bed arrangement. The method may also comprise rotating a first set of discs within a casing of the packed bed arrangement in a first direction. The method may also comprise rotating a second set of discs with the casing of the packed bed arrangement in a second direction, wherein the first direction and the second direction are counterrotating, wherein the fluid stream contacts both the first set of discs and the second set of discs and wherein the fluid stream undergoes a heat transfer through contact of the fluid to at least one of the first set of discs and second set of discs. The method may also comprise separating the fluid stream into the liquid phase and the gas phase through contact of the fluid stream with the first set of discs and second set of discs. The method may also comprise discharging the liquid phase and the gas phase from the rotating packed bed arrangement.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted; however, that the appended drawings illustrate only typical embodiments of this disclosure and are; therefore, not be considered limiting of its scope, for the disclosure may admit to other equally effective embodiments.

Figure 1:
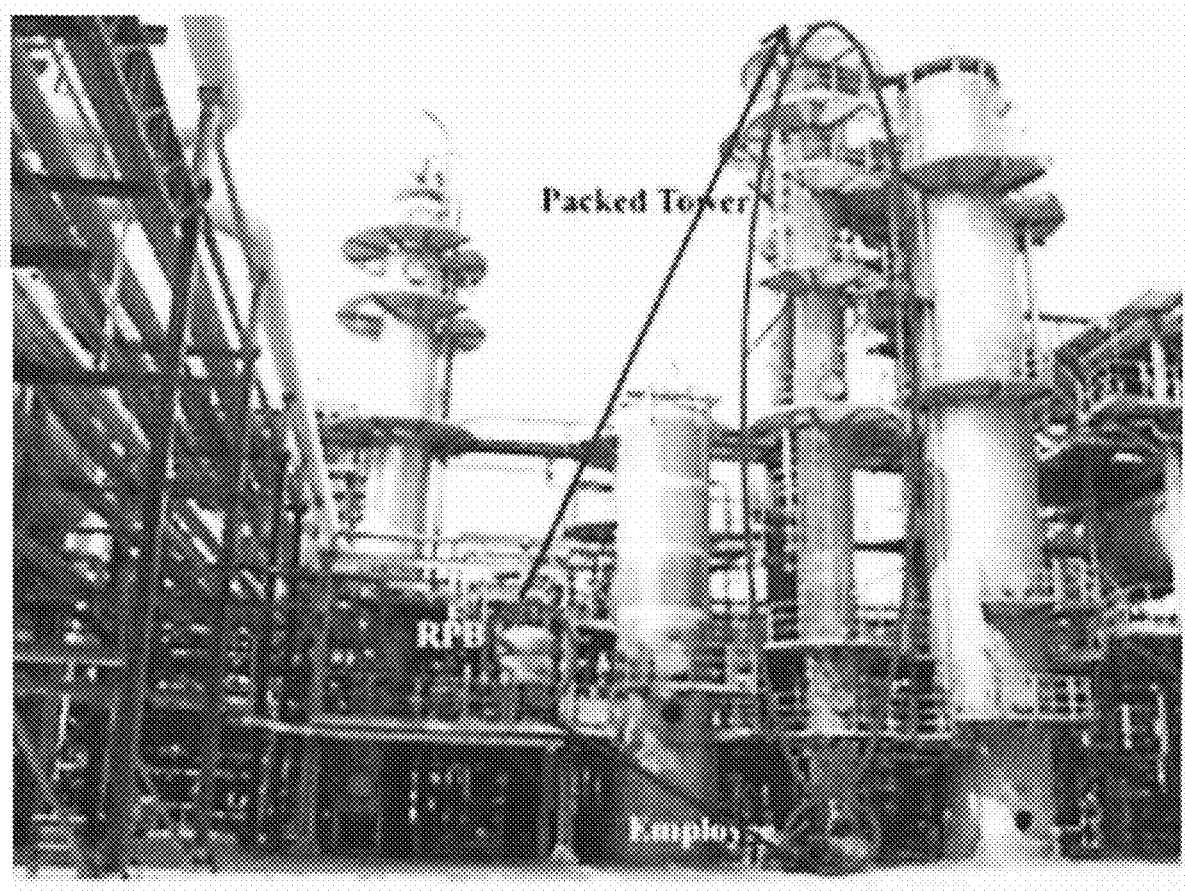
FIG. 1 is a comparison of sizes of a packed tower and rotating packed bed industry.
Figure 2A:
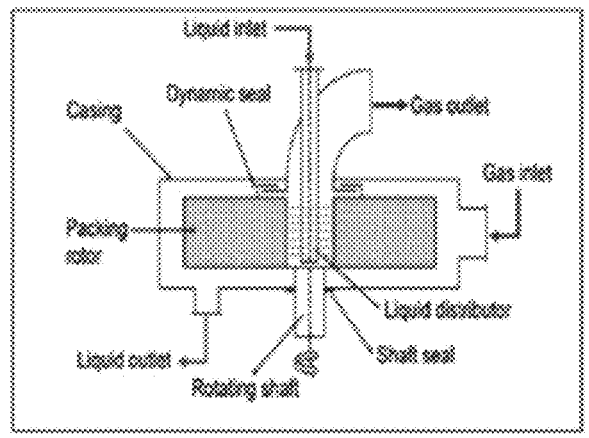
FIGS. 2a, 2b, 2c and 2d, illustrate different conventional apparatus for separating a fluid into constituent portions.
Figure 2B:
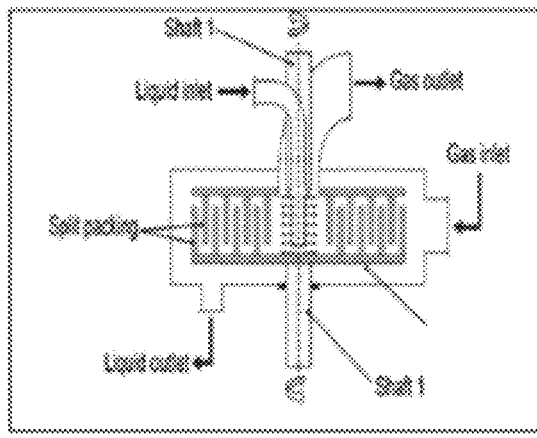
Figure 2C:
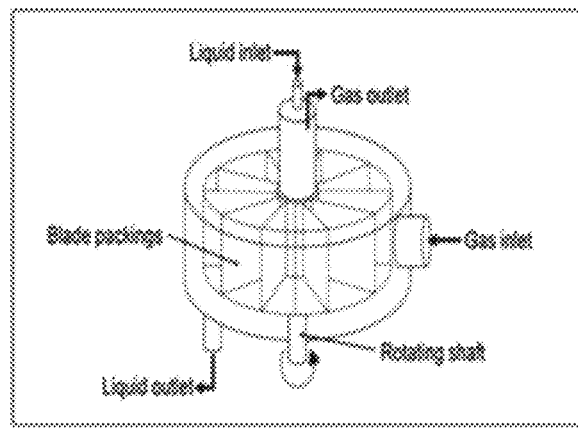
Figure 2D:
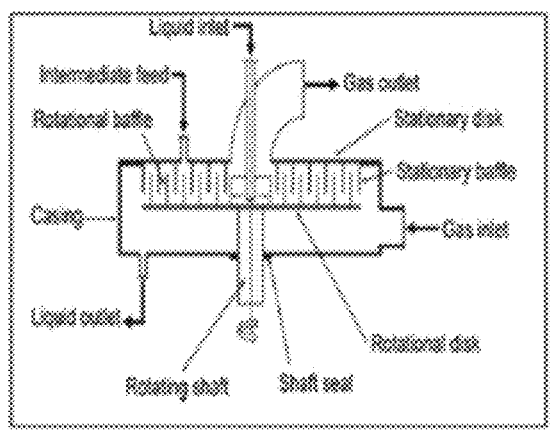
Figure 3:
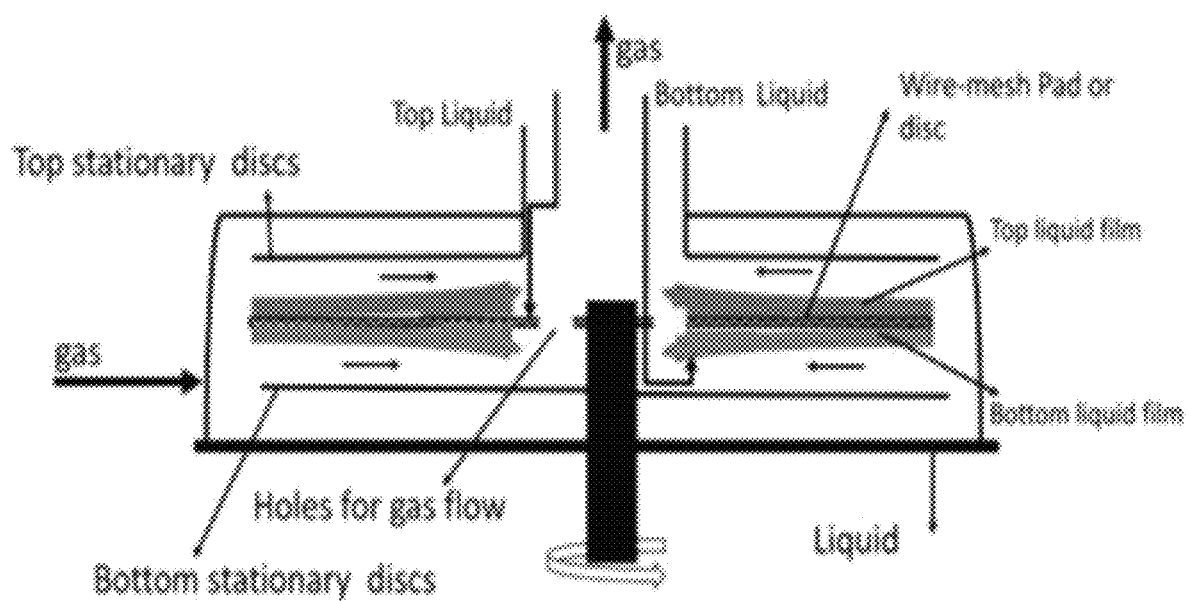
FIG. 3 is a conventional spinning disc reactor for separating a fluid into constituent portions.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood; however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages, are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, components, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood; however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

Figure 4:
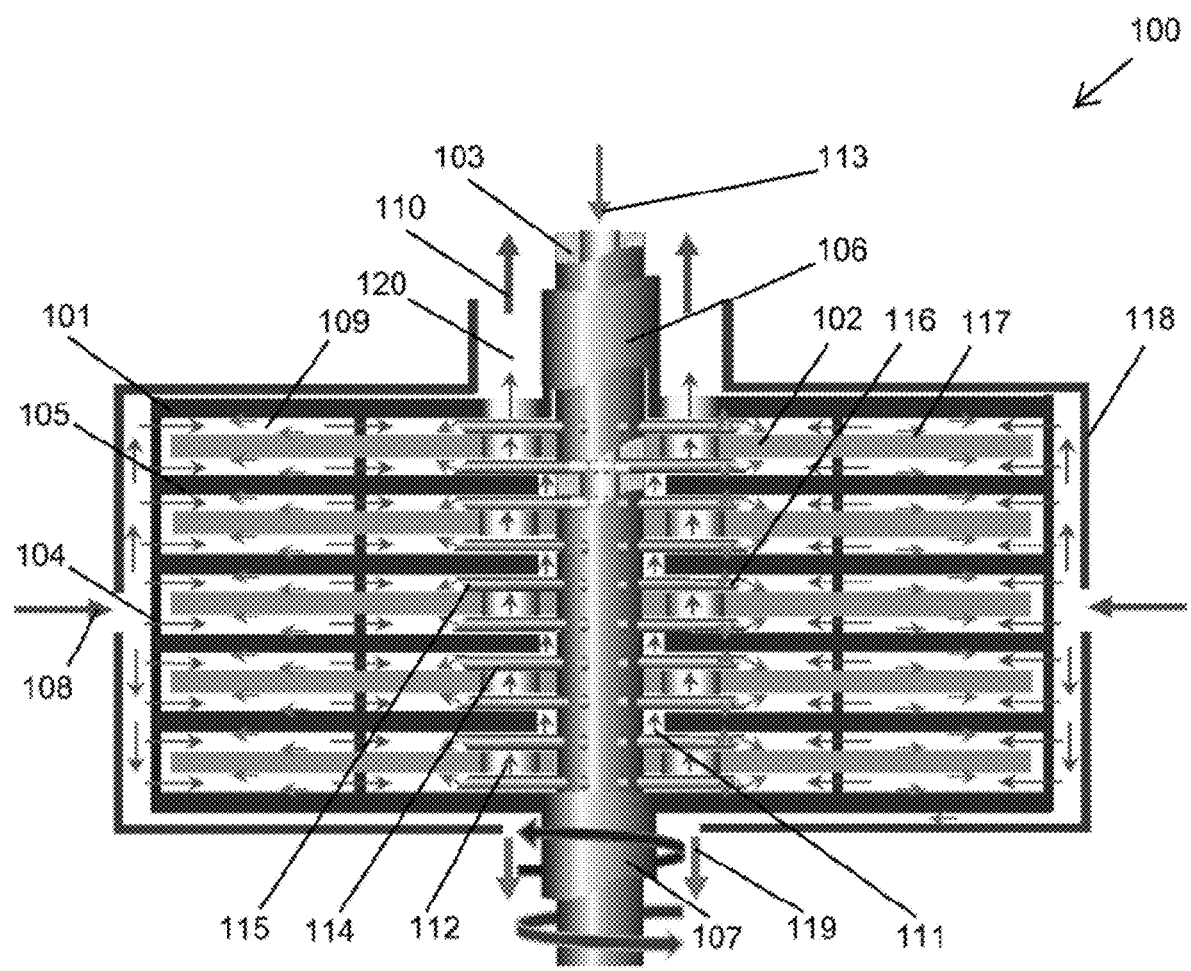
FIG. 4 is a rotating packed bed reactor in one example embodiment of the disclosure.

Aspects of the disclosure introduce a method and design of RPB which increase efficiency by keeping the component flow rates the same but reducing the size and footprint. Referring to FIG. 4, an arrangement is illustrated based on spinning disc reactor technology, but with a high process intensification achieved by utilizing two coaxial counter-rotating sets that consist of plurality alternating discs. FIGS. 4 and 5 demonstrate two possible embodiments of the current disclosure.

In one example embodiment, compactness is a complementary advantage as well as a rotational speed that can be decreased to maintain the same mass transfer coefficient. This, in turn, leads to higher reliability of the design and less energy consumption required for rotation due to less friction in the bearings. A coaxial shaft which allows for rotation is presented in FIGS. 4 and 5. The coaxial shaft allows an engine or motor to be the sole driver of the RPB. In embodiments, a gearbox is provided. Such a configuration is not feasible for other kinds of considered RPBs with counter-rotational discs. The RPB interior consists of two sets of discs 101 and 102. One disc 102 is based on an axial shaft 103. The other disc 101 is based on supports 104 connected to external rims 105 of the discs and to top 106 and bottom 107 tubular shafts which are coaxial and rotate counter directionally to axial shaft 103. The supports 104 can be of different shapes, therefore the illustrated embodiment should not be considered limiting. In one non-limiting embodiment, blade shapes are used to reinforce gas flow 108. The discs 101, 102 alternate such as every disc is placed between other discs rotating counter directionally, excluding very top and bottom discs. The overall number of the discs can vary from a minimum number of 3 to higher numbers. The channels 109 formed between discs 101, 102 can have heights of 3-100 mm in one non-limiting embodiment. All the rotating discs 101, 102 can have passages around the axial shaft 103 for the gas 108 to flow from the bottom channel into the gas outlet 110. Specifically, external discs 101 have annular ring clearances 111 around the shaft 103, while internal ones have slots 112 around the axial shaft 103. The shape of the passages can be different, such as trapezoidal, oval, round, square, or any other kind. The discs 101, 102 surfaces can have different types and roughness. The surfaces can be plain or grooved, waved, textured, or covered by metal foam, wire mesh, or woven layers, as non-limiting examples.

The liquid 113, fed into the axial shaft 103, flows from the top and is injected through the nozzles 114 onto the surfaces of the discs 101, 102. The nozzles 114 have two injectors, one part of them is directed radially 115 to supply internal discs, while others 116 are tangential with the same direction of external discs 101 rotation. Thus, all the discs 101, 102 surfaces are being covered by thin liquid films 117 flowing radially outward due to centripetal acceleration. After, the liquid leaves the discs 101, 102 rims as a thin sheet of droplets.

These droplets form a film on the casing 118 wall, which flows down to the bottom of the casing 118 to the exit 119. The gas outlet 110 may be defined by a lip placed around the overall casing, defining an opening 120.

The gas 108, supplied into the casing 118, flows through annular channels 109, formed between discs and the liquid films 117 flowing over rotating discs 101, 102 to the gas clearances 111 and slots 112 in the discs 101, 102 and further to the exit 110, located at the top of the casing 118. The gas 108 acquires tangential velocity in the annular channels due to torsional stress induced by the rotation of the discs 101, 102. The sum of the radial velocity (due to radial flow) and tangential velocity (due to torsional stress) leads to a converging spiral flow inside channels. As will be understood, a plurality of openings may be provided into the casing 118 for injection of gas. Such openings may have different shapes, such as round, oval, triangular, a simple perforation or other more complex geometries.

In one example embodiment, a motor supplies shafts with the rotation torque through a gearbox. The whole assembly is housed in the casing 118. The contact of the phases for separation or reaction takes place in the annular channels and, to a minor extent, on the casing 118.

In some operational regimes for a non-viscous fluid and high speed of the discs rotation, a nozzle can be situated on individual rotational rings. In this example embodiment, fluid splash is avoided. Examples of alternative embodiments are presented in FIGS. 5*a*, *b*, and *c*.

Figure 5A:
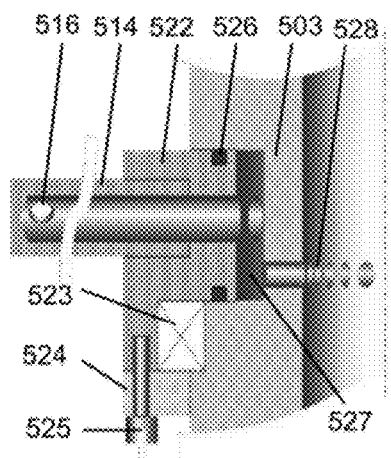
FIGS. 5a, 5b and 5c, are designs of nozzles used in conjunction with aspects of the disclosure presented.
Figure 5B:
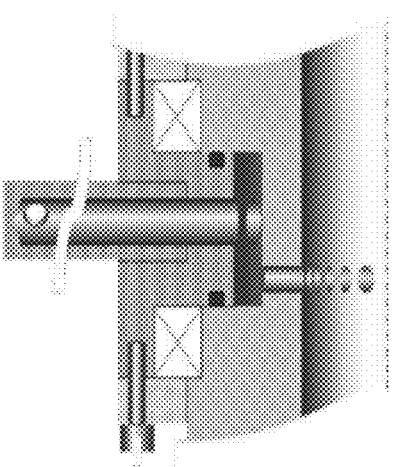
Figure 5C:
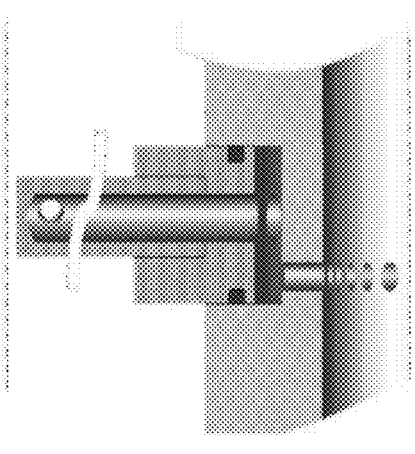

Referring to FIGS. 5*a*, 5*b* and 5*c*, design of nozzles are disclosed. These arrangements are based on rotational rings (from the left to the right): a nozzle ring based on one bearing ring in FIG. 5*a*; a nozzle ring based on two bearings in FIG. 5*b*; and a nozzle ring without bearing rings in FIG. 5*c*.

In FIG. 5A, nozzles 514 can have two diametrically opposite injectors directed angularly to the rotation plane. In embodiments, the nozzles 514 can have a configuration that is partially tangential to the rotation and partially towards the top and the bottom discs. The nozzles 514 are inserted into a ring body 522 and have a common channel for injecting the liquid. The ring body 522 is installed on the shaft using a bearing ring 523, (see, FIG. 5*a*), or two bearing rings 523 (see, FIG. 5*b*), or, in some embodiments, without a bearing ring (see, FIG. 5*c*). The bearing rings 523 are covered with cap rings 524 using screws 525. Between ring body 522 and shaft 103 (see, FIG. 4) a cavity 527 is formed. The cavity 527 is sealed with seals 526 and supplied with liquid through the plurality of the channels 528. The channels 528 are intentionally misaligned to channels of the nozzles 514. In other embodiments, the injectors may be distributed in a random, semi random or regular pattern and do not have to be diametrically opposite in configuration.

Referring to FIGS. 4 and FIGS. 5*a*, 5*b* and 5*c*, the liquid 113, fed into the shaft 103, flows from the top and is injected through the channels 528 to the cavity 527 where it levels off before entering the nozzles 514 channels. In these embodiments, liquid 113 flows from the channels 528 through the nozzles 514 into the reactor cavity of the RPB. The equalized flow, following through the injectors 516, creates a jet thrust, which leads to the rotation of the body ring 522. At the same time, by selecting the parameters of the injectors (flow rate, fluid resistance, etc.), it is possible to adjust the required speed and direction of rotation of the body ring 522. In particular, such a rotation can be achieved in which the body ring 522 maintains its azimuth position while shaft 103 rotates.

The counterrotation discs method can be applied to other RPBs' types as well. Another embodiment based on the methods described and applied to the split packing RPBs is presented in FIG. 6. In this embodiment, packings 621 can be made of metal foam, wire mesh, woven layers, or any other structured material.

Figure 6:
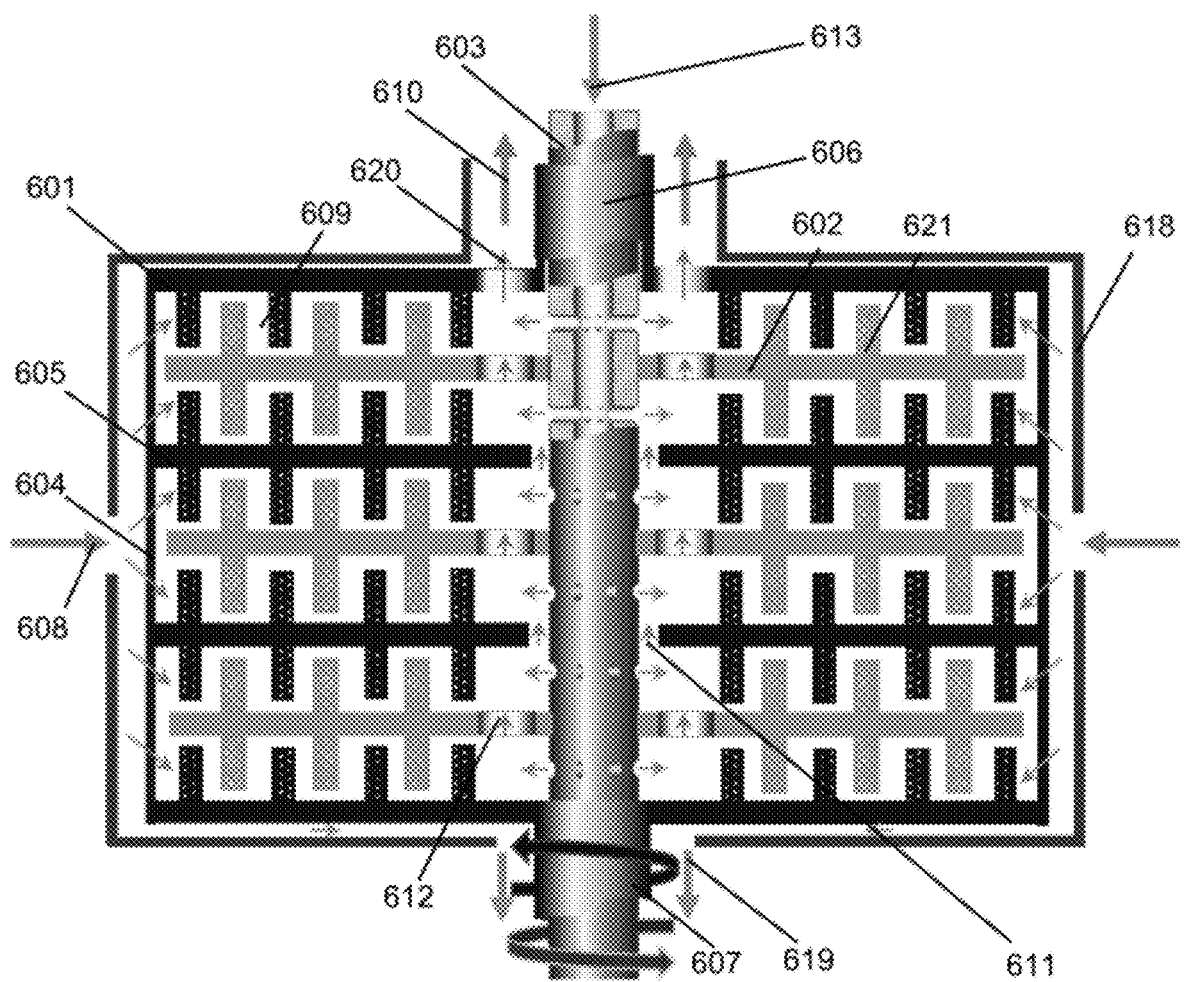
FIG. 6 is a multi-level rotating packed bed with split packing in one example embodiment of the disclosure.

Referring to FIG. 6, an embodiment of a RPB with split packing is illustrated. In order to provide a higher flexibility of chemical processes regulation in the RPBs, the rotor assembly can be divided into two parts, internal portion and external portion. The RPB interior consists of two sets of discs 601 and 602. One disc 602 is based on an axial shaft 603. The other disc 601 is based on supports 604 connected to external rims 605 of the discs and to top 606 and bottom 607 tubular shafts which are coaxial and rotate counter directionally to axial shaft 603. The discs 601, 602 alternate such as every disc is placed between other discs rotating counter directionally, excluding very top and bottom discs. The channels 609 formed between discs 601, 602 can have heights of 3-100 mm, in one non-limiting embodiment. All the rotating discs 601, 602 can have passages around the axial shaft 603 for the gas 608 to flow from the bottom channel into the gas outlet 610. External discs 601 have annular ring clearances 611 around the shaft 603, while internal ones have slots 612 around the axial shaft 603.

The liquid 613, fed into the axial shaft 603, flows from the top and is injected through the nozzles onto the surfaces of the discs 601, 602. Thus, all the discs 601, 602 packings 621 are being covered by thin liquid films flowing radially outward due to centripetal acceleration.

These droplets form a film on the casing 618 wall, which flows down to the bottom of the casing 618 to the exit 619. The gas outlet 610 may be defined by a lip placed around the overall casing, defining an opening 620.

Figure 7:
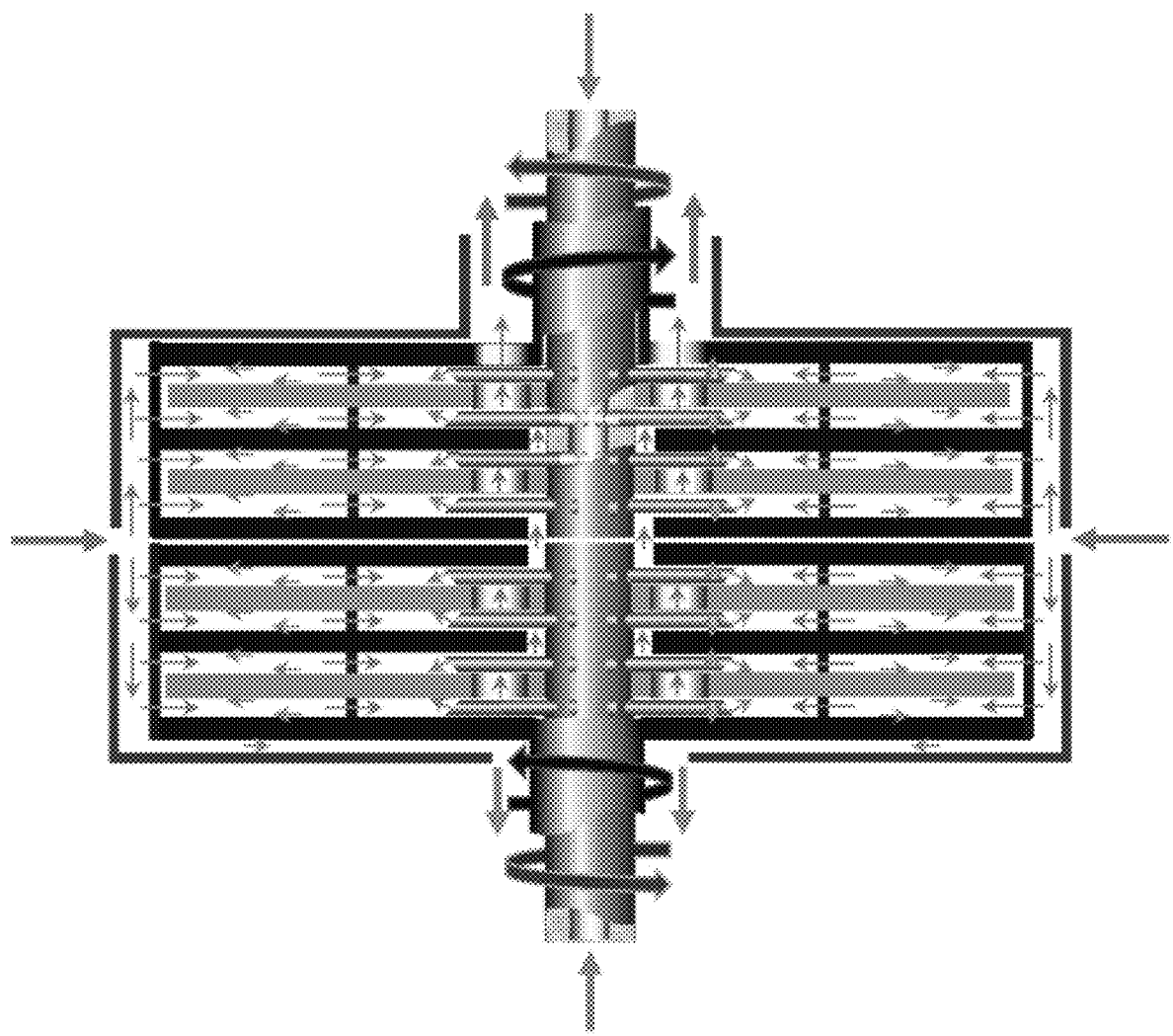
FIG. 7 is a multi-level rotating packed bed with two rotor assemblies in one example embodiment of the disclosure.

Referring to FIG. 7, another example embodiment is illustrated. In this embodiment, the upper and lower parts of the rotor can be made according to the previously disclosed method of counter-rotating discs. Different construction alternatives are possible wherein a gap may be provided between the upper and lower parts in one non-limiting example embodiment. In another example embodiment, the overall construction may use bearings. In this embodiment, portions of the embodiment can rotate independently, each with its own speed and direction of rotation. Also, in this embodiment the liquid supply is split into two parts. This embodiment may be used in applications where a two-stage chemical process organization is necessary. In the given example, the number of counter-rotating discs is 2+3 in each part, upper and lower. Other configurations are possible.

Figure 8:
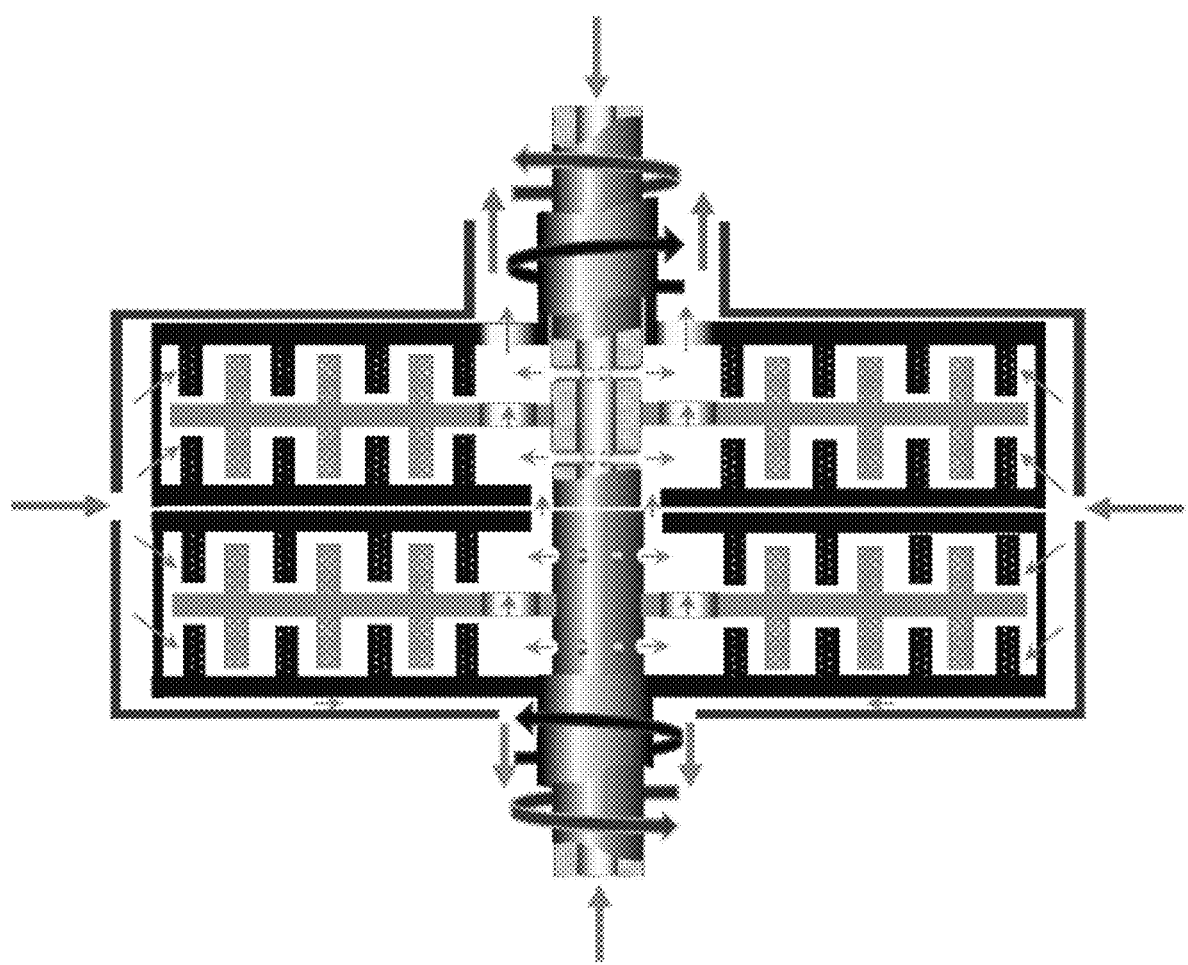
FIG. 8 is a multi-level rotating packed bed with two rotor assemblies with split packings in one example embodiment of the disclosure.

Referring to FIG. 7, an embodiment of a rotating disc RPB with two rotor assemblies is illustrated. Similar to the previous embodiments, this method and principle can be applied to BPM with split packages. An example of such an RPB is illustrated in FIG. 8. The number of discs may vary in this embodiment.

Referring to FIG. 8, an embodiment of a RPB with two rotor assemblies with split packings is illustrated. In this embodiment, the number of concentric shafts is two. Other numbers of concentric shafts may also be used. One example embodiment of the RPB is illustrated in FIG. 8, with rotating discs and split packing RPBs. In this embodiment, each individual disc is driven by its individual concentric shaft and fed by its individual source of the liquid. Flexibility of the process control and optimization is achieved in this embodiment. Though the number of the shafts can be high, it should be noted that the more shafts used in the design the more complex gearbox is required and the more expensive the resulting RPB is. In this case, at least two additional embodiments for rotating discs and split packages are illustrated in FIGS. 9 and 10.

Figure 9:
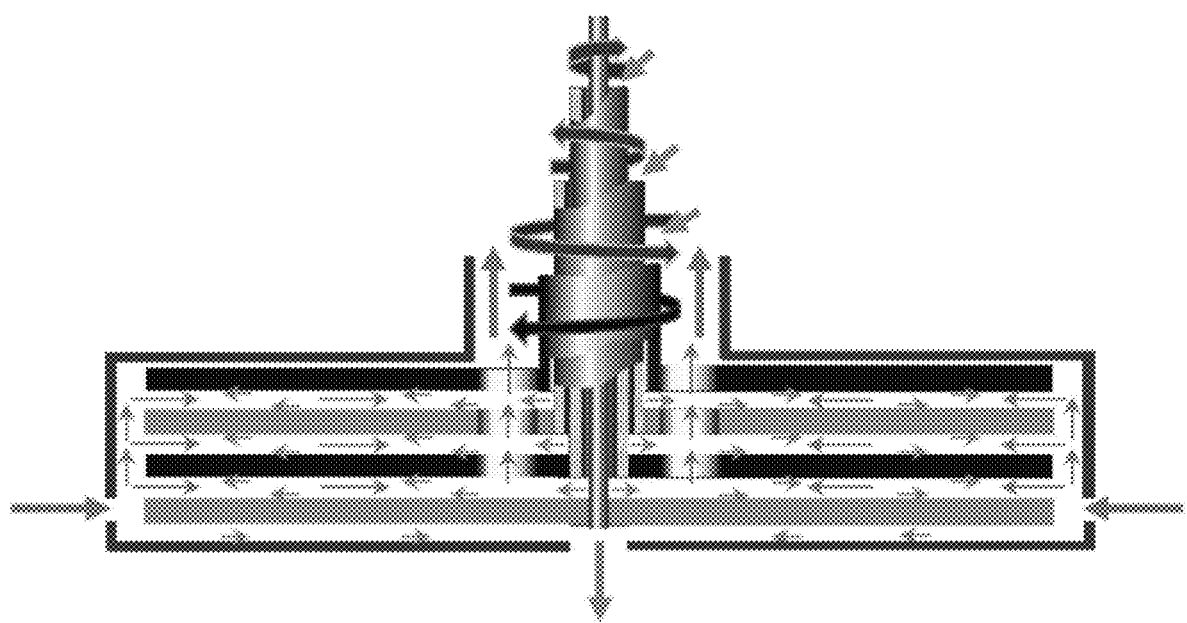
FIG. 9 is one example embodiment of the disclosure with rotating discs for a rotating packed bed with individual concentric shafts.

Referring to FIG. 9, one example embodiment, described above, is illustrated. This embodiment illustrates rotating discs RPB with individual concentric shafts.

Figure 10:
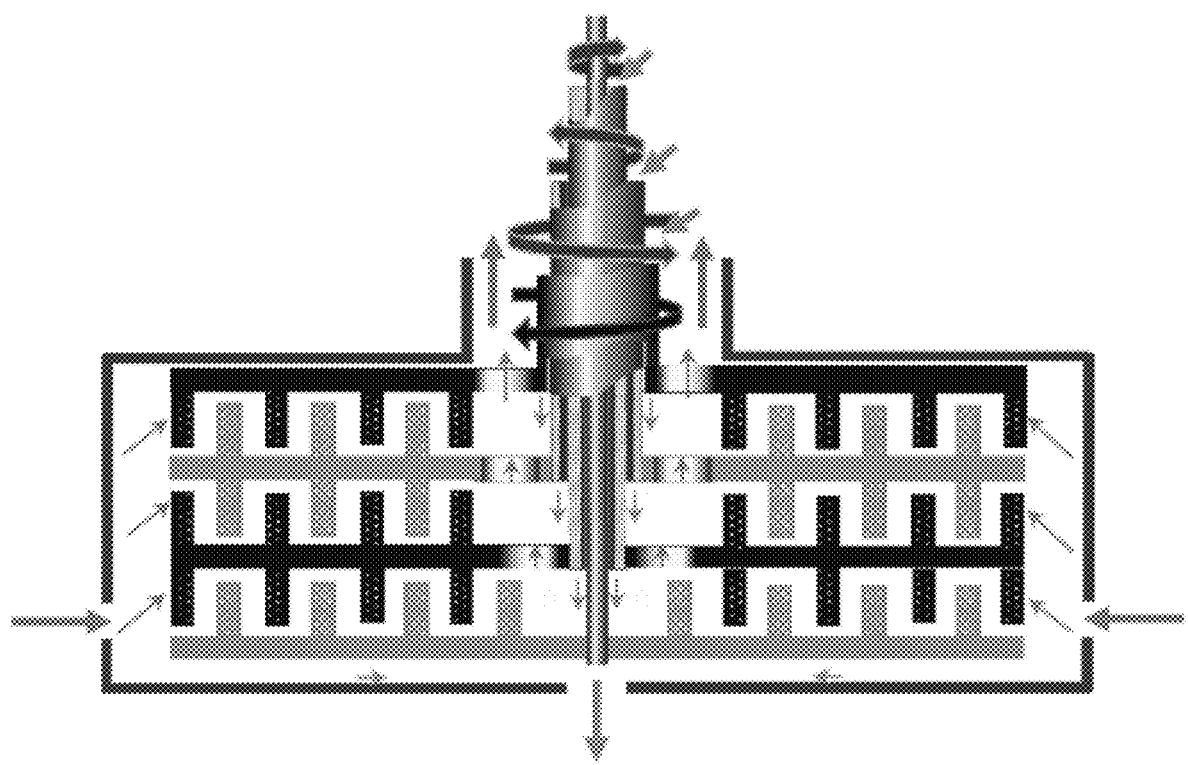
FIG. 10 is one example embodiment of a rotating packed bed with individual concentric shafts for split packings.
Figure 11:
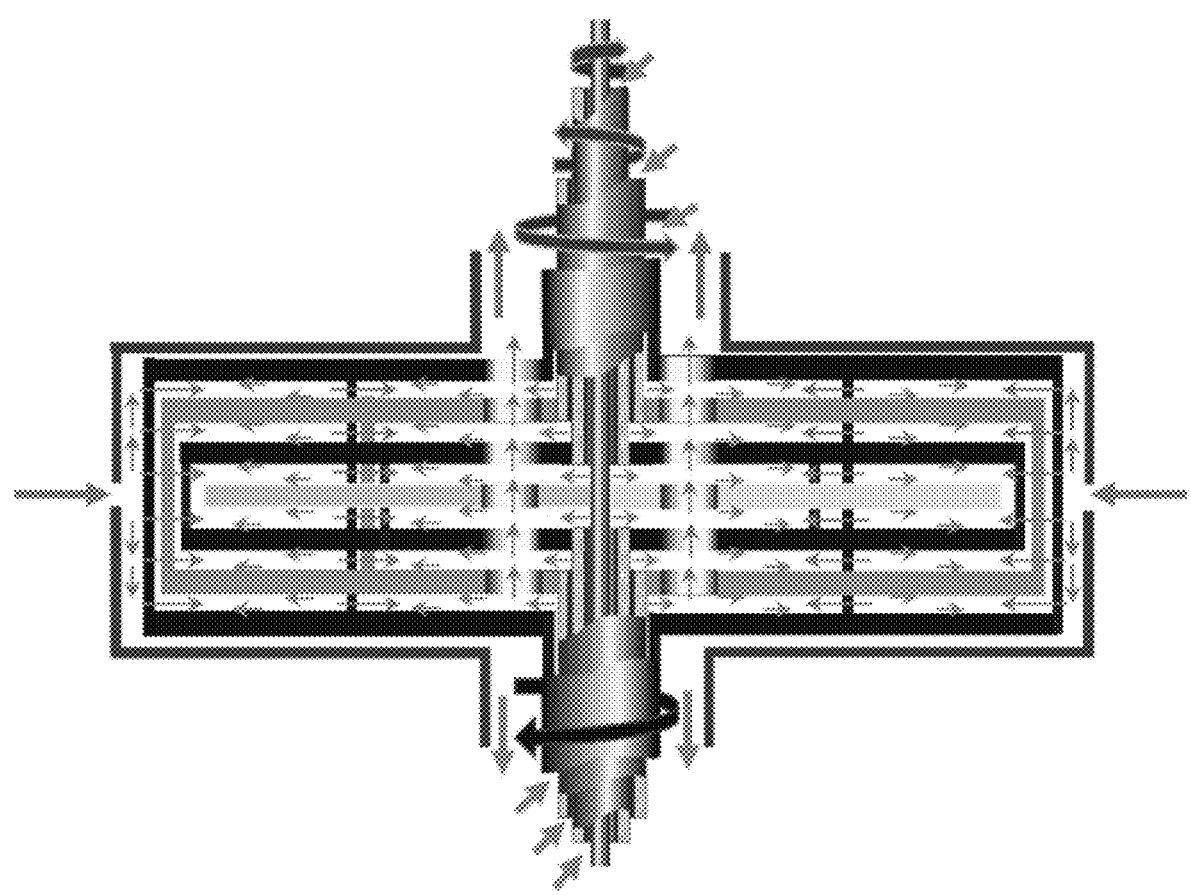
FIG. 11 is a multiple rotating disc rotating packed bed with balanced individual concentric shafts in one example embodiment of the disclosure.
Figure 12:
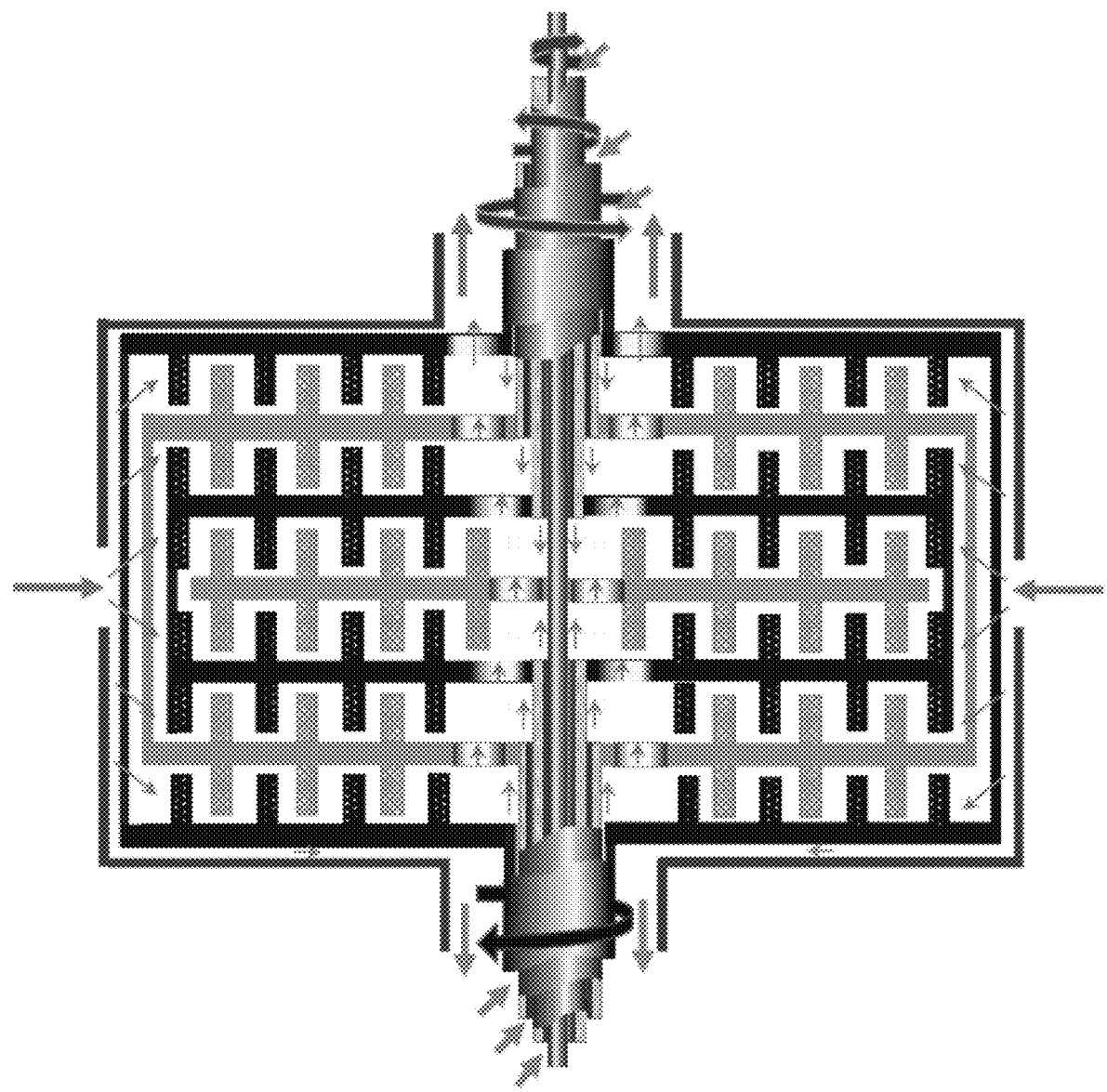
FIG. 12 is a rotating disc-rotating packed bed with balanced individual concentric shafts in one example embodiment of the disclosure.

Referring to FIG. 10, another example embodiment of a RPB with individual concentric shafts for split packings is illustrated. In the previous embodiment of the RPB, described in FIG. 9, there is a drawback, wherein there is a cantilever of all shafts, which can cause rotation imbalance due to flow fluctuations. This imbalance leads to the occurrence of parasitic oscillations. Adjustment may be made to the fluctuations of the liquid, which can lead to the formation of off-design resonance modes of operation of the RPB. These modes of operation may result in increased loads on the bearings. As a result, this can be the cause of a significant decrease in the efficiency of the RPB and, ultimately, premature failure. One solution to this problem is to significantly lengthen the shaft base (increase the distance between the bearings) if the center of the rotor mass is beyond of shaft base. In other embodiments, a solution may be to symmetrically balance the loads by placing the bearings on either side of the center of mass of the rotor. FIGS. 11 and 12 show alternative configurations solving this imbalance problem. Additionally, these configurations allow operators to provide individual disc rotation speed and directional control. Different types of liquids with different properties may be used within the system.

Figure 13A:
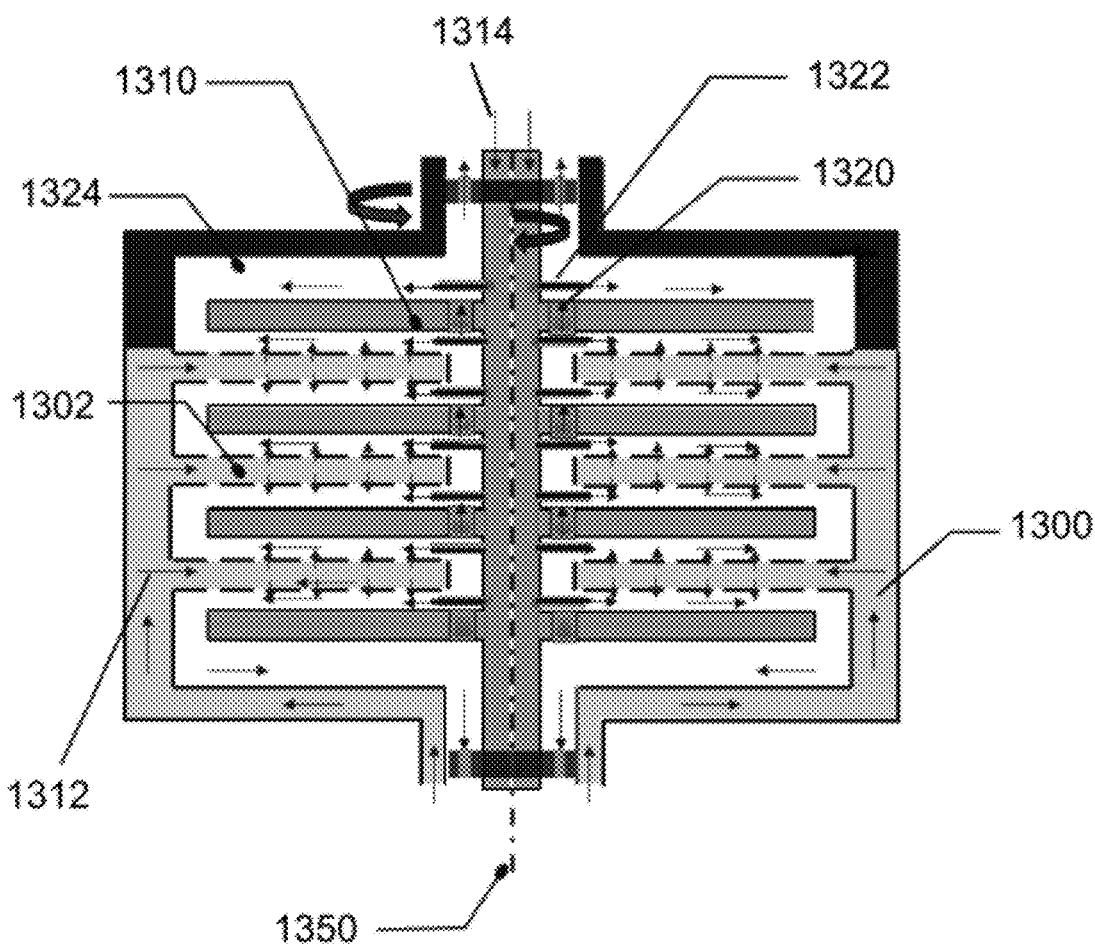
FIG. 13a is another example embodiment of a rotating packed bed in accordance with the disclosure.
Figure 13B:
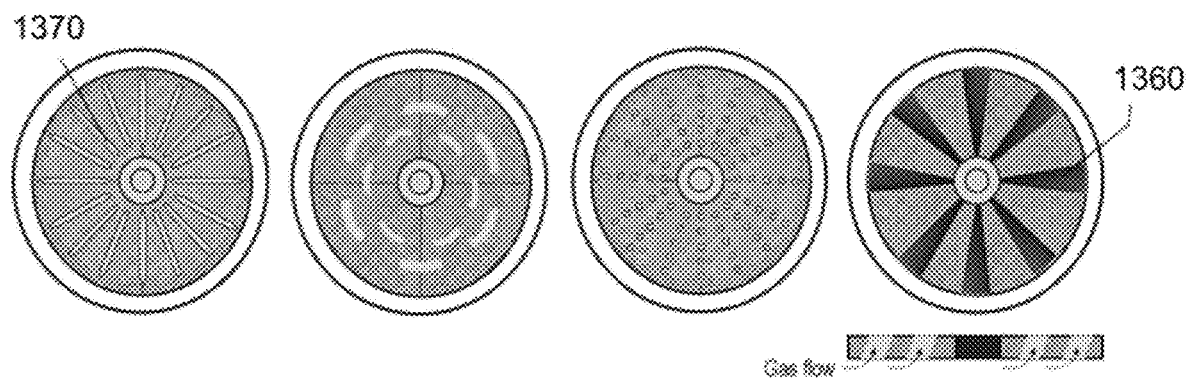
FIG. 13b are plan views of opening variations of one embodiment of the disclosure.

Another embodiment of the disclosure is shown in FIG. 13a, where an external rotating disc arrangement 1300 is equipped with hollow channels 1302 to allow distributed gas flow 1312 in the radial direction. Holes 1320 may be provided, in some embodiments, to ease process flow. Rotation for the moving parts of the arrangement may be around a central axis 1350. Injection of fluid may be accomplished through nozzles 1322. As in previous described embodiments, the external disc arrangement 1300 and the internal disc 1310 rotate in opposite directions. Passage of gas may be through channels 1324 to the top of the arrangement 1300. The liquid 1314 is supplied through the central shaft of the internal rotating disc as before and spreads as a thin film. This configuration provides better control over the mixing of gas with the thinly spread liquid film in each pair of counter rotating discs. The external rotating disc arrangement 1300 can have different designs of the openings to optimize the gas distribution. One such design is shown in FIG. 13b, where the openings are narrow slits with uniform cross-section (few millimeters wide). The openings can have many other variations, e.g., non-uniform cross-section depending on the desired flow configuration and process optimization. The speed and direction of rotation of the external and internal sets of discs can vary within wide limits, the external discs can be completely stopped and thus used as stators. In FIG. 13b, slit openings may be placed on the outside rotating disc, as illustrated in the left most portion of the figure at 1370. At the right side of FIG. 13b, the opening 1360 may be shaped as in impeller, helping fluid flow. As will be understood in all of the embodiments, different disc systems may rotate in different rotational directions or in the same direction; therefore, the disclosure is not limited to one embodiment. Disc systems may also be operated at different speeds relative to one another. Moreover, disc sizes and contact areas may be augmented between systems to provide for greater or lesser contact area.

Figure 14:
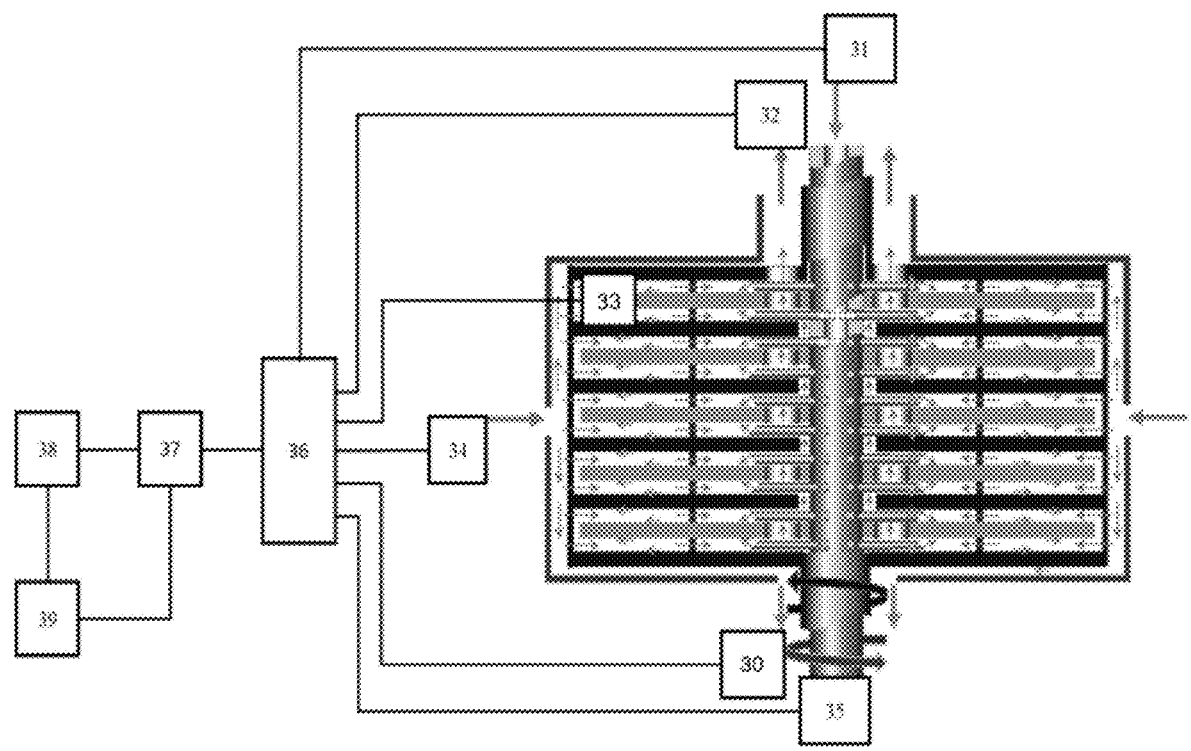
FIG. 14 is a scheme of a rotating packed bed with digitization in one example embodiment of the disclosure.

Referring to FIG. 14, development of the design, determination of the range of operating parameters, their optimization, and operational control are one of the most complex elements of the RPB technology. Achieving these goals is impossible without testing and studying the operating parameters of the product. Schematic diagram of solving these problems in a single complex using elements of system engineering and artificial intelligence is provided in FIG. 14. This embodiment is very versatile and can be applied to any RPB design, including but not limited to embodiments of the disclosed embodiments.

In FIG. 14, liquid input data is measured by a plurality of instruments and sensors 31 (for instance flow meter, viscosimeter, pressure and temperature sensors, chemical species concertation sensors, etc.). Liquid output data is measured by a plurality of instruments and sensors 30 (for instance, the same as for the liquid input data). Gas input data is measured by a plurality of instruments and sensors 34 (for instance, flow meter, pressure, and temperature sensors, chemical species concertation sensors, etc.). Gas output data is measured by a plurality of instruments and sensors 32 (for instance, the same as for the gas output data). The overall chemical process is measured by a plurality of instruments and sensors 33 installed in the reactor domain of RPB (for example, pressure and temperature sensors, chemical species concertation sensors, etc.). Further measurements may be taken. These further measurements may include mechanical data that is measured by a plurality of instruments and sensors 35 (RPM sensor, torque sensor, vibration sensors, etc.). An analog-to-digital transformer 36 may also be provided. Collected digital data is transmitted to a processor 37 for the initial data processing, preliminary analysis, and/or transformation. Specially processed data is transmitted to monitors (not shown); to be displayed to operators and/or sent to data storage. Data may also be transmitted for other purposes. An artificial intelligence processor 38 (for example, based on statistical models, neural net, etc.) may be provided as well as a computer arrangement 39. The computer arrangement 39 may be connected to controllers (not shown) of RPB control elements (for example, valves, motor supply, etc.) provides optimization and automatic/semiautomatic control of the RPB operation.

Figure 15:
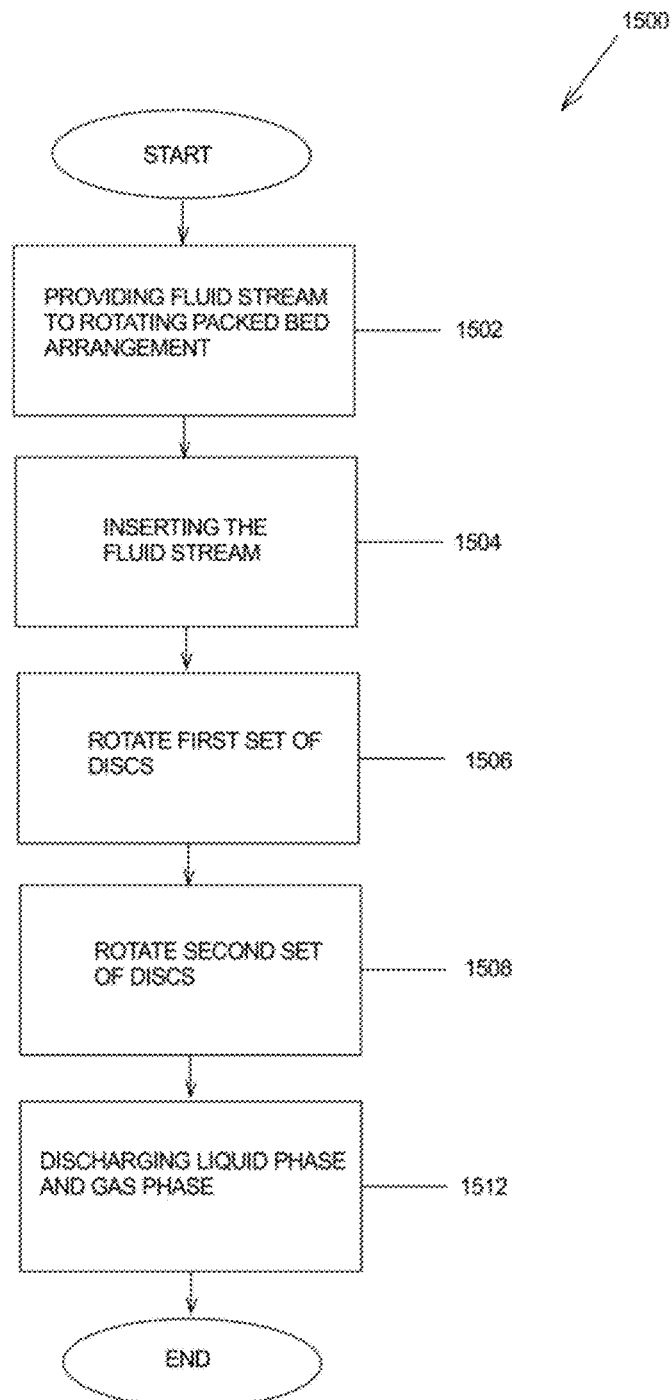
FIG. 15 is a method in accordance with one example embodiment of the disclosure.

A method for separating a fluid stream into a liquid phase and a gas phase is illustrated in FIG. 15. A method 1500 involves several method steps. At 1502, the method entails providing the fluid stream to a rotating packed bed arrangement. At 1504, the method further entails inserting the fluid stream into the packed bed arrangement. At 1506, the method further provides for rotating a first set of discs within a casing of the packed bed arrangement in a first direction. At 1508, the method further provides for rotating a second set of discs with the casing of the packed bed arrangement in a second direction, wherein the first direction and the second direction are counterrotating and wherein the fluid stream contacts both the first set of discs and the second set of discs. The method may further provide for separating the fluid stream into the liquid phase and the gas phase through contact of the fluid stream with the first set of discs and second set of discs. The method also provides, at 1512, discharging the liquid phase and the gas phase from the rotating packed bed arrangement.

Embodiments of the apparatus and methods above can be performed in conjunction with digital apparatus. Such digital controlled apparatus may include computing apparatus, such as computers, laptops, servers and cloud computing-based units. These digitally controlled apparatus may be programmed with non-volatile computer instructions to allow the digital control of equipment within the field. Such control may, in some alternatives, use artificial intelligence networks or systems. In some further embodiments, the artificial intelligence networks may have feedback loops to allow the network to be trained to become more efficient over time. Operations; therefore, may be optimized according to past events, thereby saving costs. Control units on the RPBs may have their own computing apparatus that link to network servers, for example, to allow for remote operation of the RPB. Input parameters, such as fluid flow, temperature control (in and out) may also be controlled through the use of solenoid valves that have actuators that are controlled either locally, through artificial intelligence and/or from a remote workstation. Records may be kept by the computing apparatus and the optimum processing may be achieved by periodic "re-learning" of the system based on previous performance instead of a training set provided by programmers. Embodiments using artificial intelligence may use a single node layer that is updated periodically. Other embodiments using artificial intelligence may use multiple layer technology to provide a deeper learning capability.

Example embodiments of the disclosure are described herein. The embodiments disclosed should not be considered limiting. In one example embodiment, an apparatus is disclosed. The apparatus may comprise a casing defining an interior volume, the casing having a plurality of entrances configured to inject a gas into the interior volume, the casing further having a top and bottom opening. The apparatus may also comprise at least a first set of discs configured to rotate around an axis, the at least first set of discs placed within the interior volume and configured to rotate in a first direction. The apparatus may also comprise at least a second set of discs configured to rotate around the axis, the at least second set of discs placed within the interior volume and configure to rotate in a second direction, wherein the first direction is different than the second direction. The apparatus may also comprise a first shaft with a first end and a second end, the shaft connected to first set of discs. The apparatus may also comprise a second shaft connected to the second set of discs. The apparatus may also comprise a set of discs and second set of discs, wherein upon rotation of the first shaft, the first set of discs is configured to rotate and wherein upon rotation of the second shaft the second set of discs is configured to rotate and wherein a fluid entering the casing through the top opening of the casing is separated into a liquid phase and a gas phase and wherein the liquid phase is configured to exit the bottom opening and the gas phase is configured to exit the top opening wherein the plurality of entrances has a shape of one of a slot, a circle, an oval, a rectangle, a triangle, a pentagon or any other applicable shape.

In another example embodiment, the apparatus may be configured wherein a surface of the at least first set of discs and second set of discs is configured with one of a grooved, waved and textured surface.

In another example embodiment, the apparatus may further comprise a driving arrangement connected to the first shaft and the second shaft, the arrangement configured to rotate the first shaft and the second shaft.

In another example embodiment, the apparatus may further comprise a gearbox connected to the driving arrangement.

In another example embodiment, the apparatus may be configured wherein the second shaft is configured within the first shaft.

In another example embodiment, the apparatus may further comprise a set of nozzles configured to spray a fluid within the casing.

In another example embodiment, the apparatus may be configured wherein each nozzle of the set of nozzles has a set of diametrically opposite injectors.

In another example embodiment, the apparatus may further comprise a set of split packing located within the casing.

In another example embodiment, the apparatus may be configured wherein the first shaft and the second shaft are concentric in arrangement.

In another example embodiment, the apparatus may be configured wherein the first shaft and second shaft are balanced.

In another example embodiment, the apparatus may be configured wherein the fluid entering the casing through the top opening of the casing enters through the first shaft.

In another example embodiment, the apparatus may be configured wherein the fluid is split into two fluid streams.

Another example embodiment of the disclosure presents a method. The method may provide for separating a fluid stream into a liquid phase and a gas phase. The method may comprise providing the fluid stream to a rotating packed bed arrangement. The method may also comprise inserting the fluid stream into the packed bed arrangement. The method may also comprise rotating a first set of discs within a casing of the packed bed arrangement in a first direction. The method may also comprise rotating a second set of discs with the casing of the packed bed arrangement in a second direction, wherein the first direction and the second direction are counterrotating, wherein the fluid stream contacts both the first set of discs and the second set of discs. The method may also comprise separating the fluid stream into the liquid phase and the gas phase through contact of the fluid stream with the first set of discs and second set of discs. The method may also comprise discharging the liquid phase and the gas phase from the rotating packed bed arrangement.

In another example embodiment, the method may be performed wherein the separating of the fluid stream into the liquid phase and the gas phase is along a tortuous path.

In another example embodiment, the method may further comprise changing a speed of at least the first set of discs and second set of discs.

In another example embodiment, the method may further comprise collecting at least one of the liquid phase and gas phase.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. A method for separating a fluid stream into a liquid phase and a gas phase, comprising:
   providing the fluid stream to a rotating packed bed arrangement;
   inserting the fluid stream into the packed bed arrangement;
   rotating a first set of discs within a casing of the packed bed arrangement in a first direction;
   rotating a second set of discs with the casing of the packed bed arrangement in a second direction, wherein the first direction and the second direction are counterrotating, wherein the fluid stream contacts both the first set of discs and the second set of discs, wherein the first and second sets of discs are coupled to respective first and second shafts arranged in a nested shaft assembly, wherein the nested shaft assembly comprises a plurality of fluid ports at a respective plurality of axial positions, wherein each fluid port of the plurality of fluid ports is configured to route a flow into one or more flow paths of a plurality of flow paths between the first and second sets of discs;

separating the fluid stream into the liquid phase and the gas phase through contact of the fluid stream with the first set of discs and second set of discs; and discharging the liquid phase and the gas phase from the rotating packed bed arrangement.

2. The method according to claim 1, further comprising adding or removing heat from the fluid stream after inserting the fluid stream.

3. The method according to claim 1, wherein the separating of the fluid stream into the liquid phase and the gas phase is along a tortuous path.

4. The method according to claim 1, further comprising changing a speed of at least the first set of discs and the second set of discs.

5. The method according to claim 1, further comprising collecting at least one of the liquid phase or gas phase.

6. The method according to claim 1, comprising independently controlling a speed and a direction of rotation of the first set of discs and the second set of discs.

7. The method according to claim 1, wherein the fluid stream is comprised of multiple types of liquids.

8. The method according to claim 7, wherein the multiple types of liquids have different physical properties.

9. The method according to claim 1, wherein the plurality of fluid ports comprise a plurality of radial fluid ports.

10. The method according to claim 1, wherein the nested shaft assembly defines the plurality of fluid ports at first and second axial ends of the respective first and second shafts.

11. The method according to claim 1, wherein the first sets of discs, the second set of discs, or both, comprises:

a first disc portion extending crosswise to a rotational axis of the nested shaft assembly; and a second disc portion coupled to and extending crosswise to the first disc portion.

12. The method according to claim 11, wherein each of the first and second sets of discs comprises the first and second disc portions, the second disc portions are coupled to the first set of discs at a first plurality of radial positions, the second disc portions are coupled to the second set of discs at a second plurality of radial positions different from the first plurality of radial positions, and the second disc portions of the first and second sets of discs at least partially overlap in the axial direction relative to the rotational axis.

13. The method according to claim 1, comprising:

supplying flows into the rotating packed bed arrangement in both a radial inward direction and an axial inward direction relative to a rotational axis of the nested shaft assembly;

discharging the liquid phase in a first axial outward direction away from the rotating packed bed arrangement; and discharging the gas phase in a second axial outward direction away from the rotating packed bed arrangement, wherein the first and second axial outward directions are opposite of one another.

* * * * *